Figure 1:
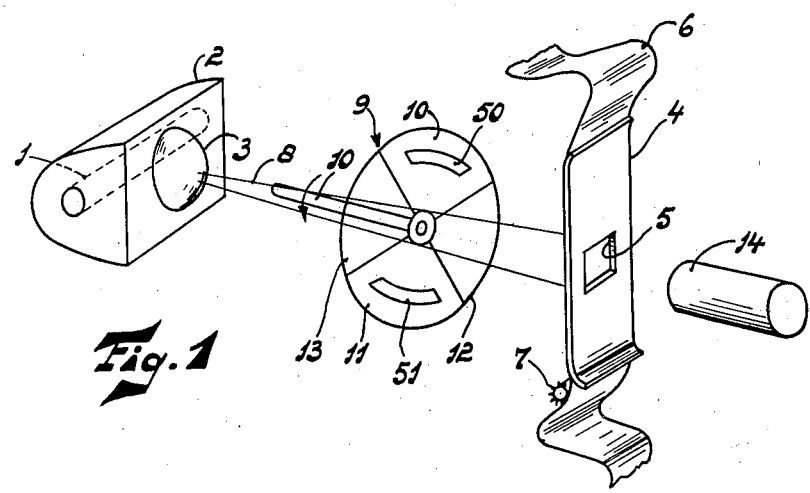

July 21, 1942.　　　P. M. VAN ALPHEN　　　2,290,458

MOTION PICTURE PROJECTOR

Filed June 12, 1940

INVENTOR
P. M. van Alphen
BY
E. F. Wendroth
ATTORNEY

Patented July 21, 1942

2,290,458

UNITED STATES PATENT OFFICE 2,290,458

MOTION PICTURE PROJECTOR

Pieter Martinus van Alphen, Eindhoven, Netherlands, assignor, by mesne assignments, to Hartford National Bank and Trust Company, Hartford, Conn., trustee Application June 12, 1940, Serial No. 340,189
In Germany May 25, 1939

5 Claims. (Cl. 88—19.3)

My invention relates to motion picture projectors and more particularly to the shutters of such projectors.

As is well known, the light emitted by the various light sources used in motion picture projectors is to a greater or lesser degree deficient in light rays of certain colors and various means have been proposed to compensate this deficiency. For example, it has been proposed to provide the blades of the shutter with a translucent colored material which transmits substantially only the "deficient" light rays, i. e. those rays which are present in an insufficient amount in the emitted light. With this method a certain quantity of these "deficient" light rays are projected upon the screen during the "dark" periods and this results in an improvement of the color of the pictures. It has also been proposed to provide the blades of the shutter with partly-translucent or colored material for a different purpose, namely to reduce flickering.

In the U. S. application S. N. 287,646 of G. Holst, filed July 31, 1939, it has been proposed to use a shutter in which the blades are provided with translucent material, but in which the material of the masking blades, i. e. the blades which intercept the light during the periods in which the film is moved, is less transparent to the "deficient" light rays than is the material of the intermediate blades, i. e. the blades which intercept the light when the film is stationary to thereby avoid shutter flicker.

Although by using the above expedients it is possible to obtain a substantial improvement in the color of the projected light, I have found that they have the disadvantage that frequently a weak flickering appears on the screen, particularly when the emitted light has a relatively high intensity. More particularly, to avoid flickering the number of changes in the intensity of the light projected upon the screen should be at least 40 per second and if the difference in intensity is great, the number of changes should be at least about 50 per second. If the usual picture frequency of 24 pictures per second and a shutter having two opaque blades and rotating at the picture frequency are used, there will be 48 changes per second in light intensity produced by the light and dark periods. If one of these blades is made translucent to a certain degree, there will be 24 additional changes of light intensity per second, which will result in flickering. On the other hand, if both blades are made translucent to the same degree, there will be 48 changes of light intensity and there will be no flickering. However, when using this degree of translucency, it is impossible to sufficiently compensate the "deficient" light and consequently it is necessary to increase the transparency of the material of both blades to this light, but this cannot be done because if the transparency of the masking blade is increased there will be a travel ghost on the screen. Thus, further improvement in the color of the projected light is possible only by increasing the transparency of the colored material in the intermediate blade, but this results in a small flickering effect, because the changes in light intensity which occur between two consecutive light and dark periods are unequal.

The main object of my invention is to overcome the above difficulties and reduce the flickering when using such shutters. For this purpose I make the colored material of the intermediate blade or blades more transparent or translucent to the "deficient" light than is the material of the masking blade, and so proportion these blades and the area of the colored material thereof or both that the amount of light which is blocked by each intermediate blade is substantially equal to the light blocked by each masking blade.

In accordance with one embodiment of the invention, I provide the masking blade with a material which is less transparent to the "deficient" light than is the material provided in the intermediate blade, and I make the active surface of the material of the former blade greater than that of the material of the latter blade so that the quantities of light passing through the materials of both blades are substantially equal. Both blades intercept the light beam for equal periods, but the duration of the passage of light through the masking blade is longer than that through the intermediate blade and therefore the quantities of light transmitted are substantially equal.

According to another embodiment of the invention, I make the surface of the translucent material in both the masking and intermediate blades the same, but make the shutting period of the intermediate blade, i. e. the time during which this blade interrupts the light beam, greater than the shutting time of the masking blade. In other words, I make the intermediate blade somewhat larger than the masking blade and provide both blades with the same surface area of translucent material, the material of the intermediate blade being more translucent than the material of the masking blade. As a result the amount of light intercepted by each blade is the same.

In another embodiment of the invention I obtain the desired results by a combination of the above two measures. More particularly, I make the intermediate blade only slightly larger than the masking blade and make the surface area of the translucent material in the masking blade only slightly larger than the surface area of the translucent material in the intermediate blade.

Figure 2:
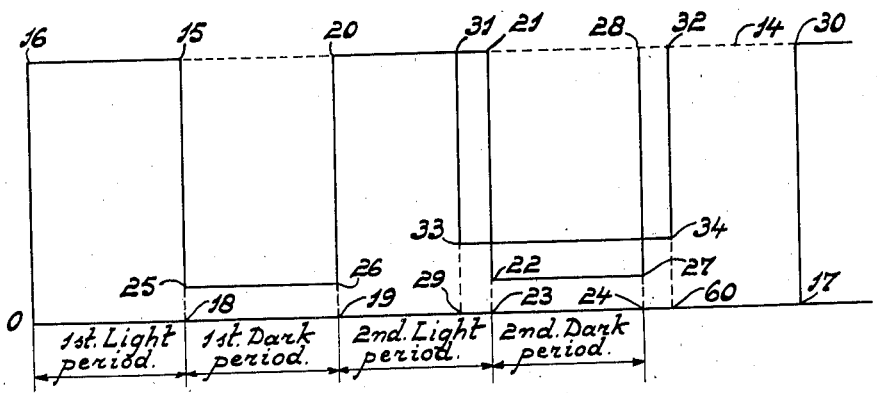
Figure 3:
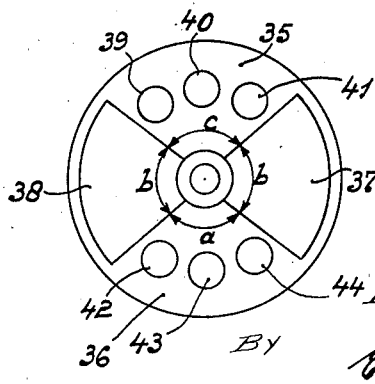

In order that the invention may be clearly understood and readily carried into effect, I shall describe the same in more detail with reference to the accompanying drawing, in which:

Figure 1 is a diagrammatic perspective view of a portion of a motion picture projector, Fig. 2 is a graph for use in explaining the invention, and Fig. 3 is a front view of a shutter according to the invention.

The projector diagrammatically illustrated in Fig. 1 comprises a light source 1 enclosed in a suitable housing 2 provided with a condenser lens 3 for the passage of a light beam 8. The light source 1 may be a high-pressure metal-vapor discharge tube of the type described in the U. S. Patents #2,094,694 and #2,094,695 to Cornelis Bol et al., and is artificially cooled, for instance by circulating water through the housing 2. As such tubes, as well as the method of cooling the same, are well known in the art, further discussion of the same is believed unnecessary.

The projector also comprises an objective 14 and a film-gate 4 provided with a picture aperture 5 past which a picture film 6 is moved intermittently in known manner by a sprocket 7. Disposed between the light source 1 and the film-gate 4 so as to intercept periodically the light beam 8, is a shutter 9 mounted on a shaft 10 which is rotated at the picture frequency of the film 6. More particularly, if the film is moved at the rate of 24 frames per second, the shutter 9 is rotated at 24 revolutions per second.

The shutter 9 comprises a masking blade 10, an intermediate blade 11 and two openings 12 and 13. The blades 10 and 11 are of metal and are provided with windows 50 and 51, respectively, of a material which is transparent mainly to the "deficient" light rays of the light beam 8, for example red glass.

If the blades 10 and 11 are of the same size, and the material of the members 50 and 51 is the same and of the same size, we obtain the results indicated in Fig. 2, which shows the conditions for one revolution of the shutter, and in which the line 14 indicates the intensity of the light beam 8 leaving the light source 1. The area of the rectangle 16—15—18—0 is a measure of the amount of light passing through the opening 13 during the first light period, the area of rectangle 25—26—19—18 is a measure of the amount of light passing through the masking blade 10 during the first dark period in which the film moves, the area of rectangle 20—21—23—19 is a measure of the amount of light passing through the opening 12 during the second light period, and the rectangle 22—27—24—23 is a measure of the light passing through the intermediate blade 11 during the second dark period during which the film is stationary. The rectangles 15—20—26—25 and 21—28—27—22 are measures of the light intercepted by the blades 10 and 11 respectively.

To avoid ghost travel of the image, the amount of light transmitted through the masking blade 10 must not exceed a given value, for example an amount indicated by the area of the rectangle 25—26—19—18, and consequently the transparency of the colored material used in this blade should permit the passage of only this amount of light. Furthermore, to avoid flicker on the screen, the number of changes in light intensity must exceed 40 per cent and the magnitudes of the changes in intensity must be as nearly equal as possible. Thus the distances 15—25 and 21—22 should be as nearly equal as possible. Furthermore, it is necessary that the amount of light transmitted during the light periods should be equal, i. e. the area of rectangle 16—15—18—0 should be substantially equal to that of the rectangle 20—21—23—19. In addition, the amounts of light intercepted by the two blades should be substantially equal, i. e. the area of rectangle 15—20—26—25 should be substantially equal, to that of rectangle 21—28—27—22.

These conditions are met in the case illustrated in Fig. 1 in which the translucent colored material of both blades has the same transparency. However, if the transmitted intensity of light rays of a definite color is to be increased, this can only be done by increasing the transparency of the material 51 of the intermediate blade, because a further increase in the transparency of the masking blade would increase the danger of travel ghost. Thus in accordance with the invention, the material 51 of the intermediate blade is made more transparent than the material 50 of the masking blade, but the length of the material 51 is decreased so that the amount of light intercepted by the intermediate blade will be the same as that intercepted by the masking blade. On the other hand, the material 51 of the intermediate blade 11 can be made more transparent, and the size of this blade can be increased so that the amount of light intercepted by both of the blades 10 and 11 remains the same. In the latter case the duration of the dark period produced by the intermediate blade (indicated by line 33—34) is increased. The amount of light intercepted by the intermediate blade during this increased dark period is indicated by the rectangle 31—32—34—33, and the area thereof is substantially the same as that of the rectangle 15—20—26—25. As a result, the duration of the light period on each side of the second dark period are reduced so that the amounts of light transmitted during those light periods are reduced to values which are the same, and are indicated by the areas of rectangles 20—31—29—19 and 32—30—17—60. This, of course, results in a reduction in the size of the openings 12 and 13 of the shutter and thus a loss of transmitted light during the light periods. However, the increase in light obtained by using a colored material of greater translucency in the intermediate blade compensates this. In this manner a definite quantity of the white light, which is usually transmitted during the light periods, is replaced by an equal quantity of light of the desired color.

The shutter shown in Fig. 3, which can replace the shutter of Fig. 1, comprises a masking blade 35 of opaque material, an intermediate blade 36 of opaque material, and two openings 37 and 38. The masking blade 35 is provided at the point of interception of the light beam with three discs 39, 40 and 41 of a material which is transparent to the "deficient" light rays of the light beam, and the intermediate blade 36 is also provided with three discs 42, 43 and 44, which are transparent to the "deficient" light rays. If the light beam is deficient, for example in red light rays, the discs 39, 40 and 41 may be of red glass, and as these discs are in the masking blade they may be of a dark red glass. However, as the intermediate blade 36 does not mask the movement of the picture, the discs 42, 43 and 44 may have a greater transparency and may be of a light red glass. However, in order that there will be no flickering due to the difference in translucency of the discs, the angle $a$ of blade 36 is made larger than the angle $c$ of blade 35, and to such an extent that both of these blades intercept the same amount of light.

The transparency of the discs 39, 40 and 41 of the masking blade can be increased to such a degree that the amount of light transmitted therethrough is slightly below that value at which travel ghost of the image is just perceptible. However, if the film is moved in the usual intermittent manner by a maltese cross mechanism, its movement is very slow at the beginning and end and is a maximum in the middle. Therefore, I prefer to give the outer discs 39 and 41 a higher transparency than the center disc 40.

Although I have described my invention in connection with specific examples and applications, I do not desire to be limited thereto, because obvious modifications will appear to one skilled in the art. For example, other types of light sources and shutters may be employed, and various types and shapes of transparent material may be used.

What I claim is:

1. In a motion picture projector having a light source adapted to emit a light beam which is deficient in light of a certain color, a shutter having a masking blade and an intermediate blade, and colored translucent material in each of said blades and transmitting substantially only the deficient light rays of said beam, the material in the intermediate blade being more translucent to the deficient light rays than is the material in said masking blade, the effective surface area of the material in the intermediate blade having a value at which the amount of light blocked thereby is substantially equal to the difference between the amount of light blocked by the masking blade and the amount of light blocked by the remaining portion of the intermediate blade.

2. In a motion picture projector having a light source adapted to emit a light beam which is deficient in light of a certain color, a shutter having a masking blade and an intermediate blade, colored translucent material in each of said blades and transmitting substantially only the deficient light of said beam, the material in the intermediate blade being more translucent to the deficient light than is the material in said masking blade, and the active surface area of the material in one blade being substantially equal to that of the material in the other blade, the intermediate blade being larger than the masking blade so that both blades intercept substantially the same amount of light.

3. In a motion picture projector having a light source adapted to emit a light beam which is deficient in light of a certain color, a shutter having a masking blade and an intermediate blade of substantially the same size, colored translucent material in each of said blades and transmitting substantially only the deficient light rays of said beam, the material in the intermediate blade being more translucent to the deficient light than is the material in said masking blade and having a smaller active surface area than the material of the masking blade.

4. In a motion picture projector having a light source adapted to emit a light beam which is deficient in light of a certain color, a shutter having a masking blade and an intermediate blade, and colored translucent material in each of said blades and transmitting substantially only the deficient light rays of said beam, the material in the intermediate blade being more translucent to the deficient light rays than is the material in the masking blade and being more translucent to said deficient light rays at the edge portions of the blade than at the central portion thereof, the effective surface area of the material in the intermediate blade having a value at which the amount of light blocked thereby is substantially equal to the difference between the amount of light blocked by the masking blade and the amount of light blocked by the remaining portion of the intermediate blade.

5. In a motion picture projector having a light source adapted to emit a light beam which is deficient in light of a certain color, a shutter having a masking blade and an intermediate blade, and color translucent material in each of said blades and transmitting substantially only the deficient light rays of said beam, the material in the intermediate blade being more translucent to the deficient light rays than is the material in said masking blade, the areas of the intermediate blade and of the translucent portion thereof being so proportioned relative to the areas of the masking blade and of the translucent portion thereof that each blade blocks substantially the same amount of light.

PIETER MARTINUS van ALPHEN.